Patented May 17, 1927.

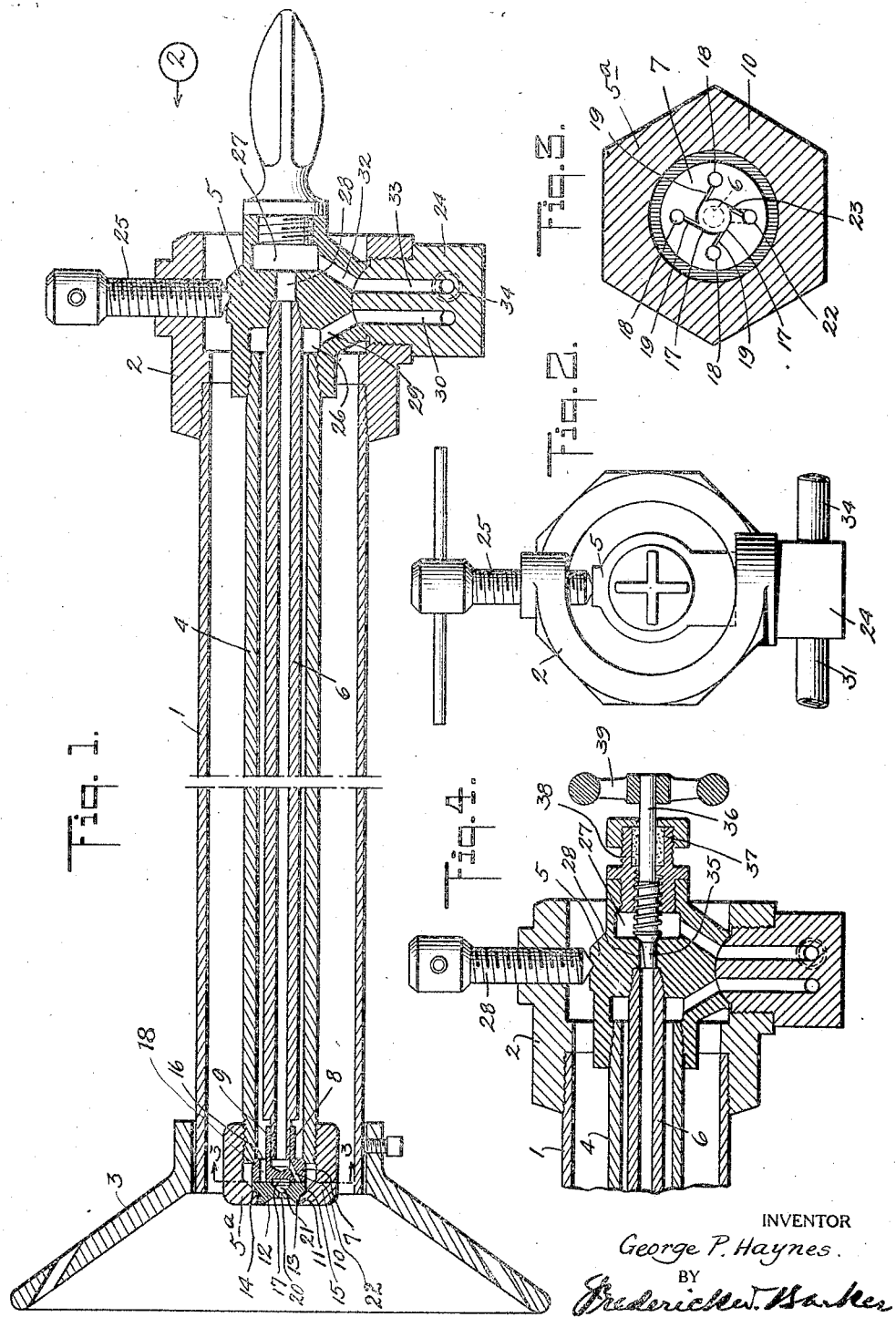

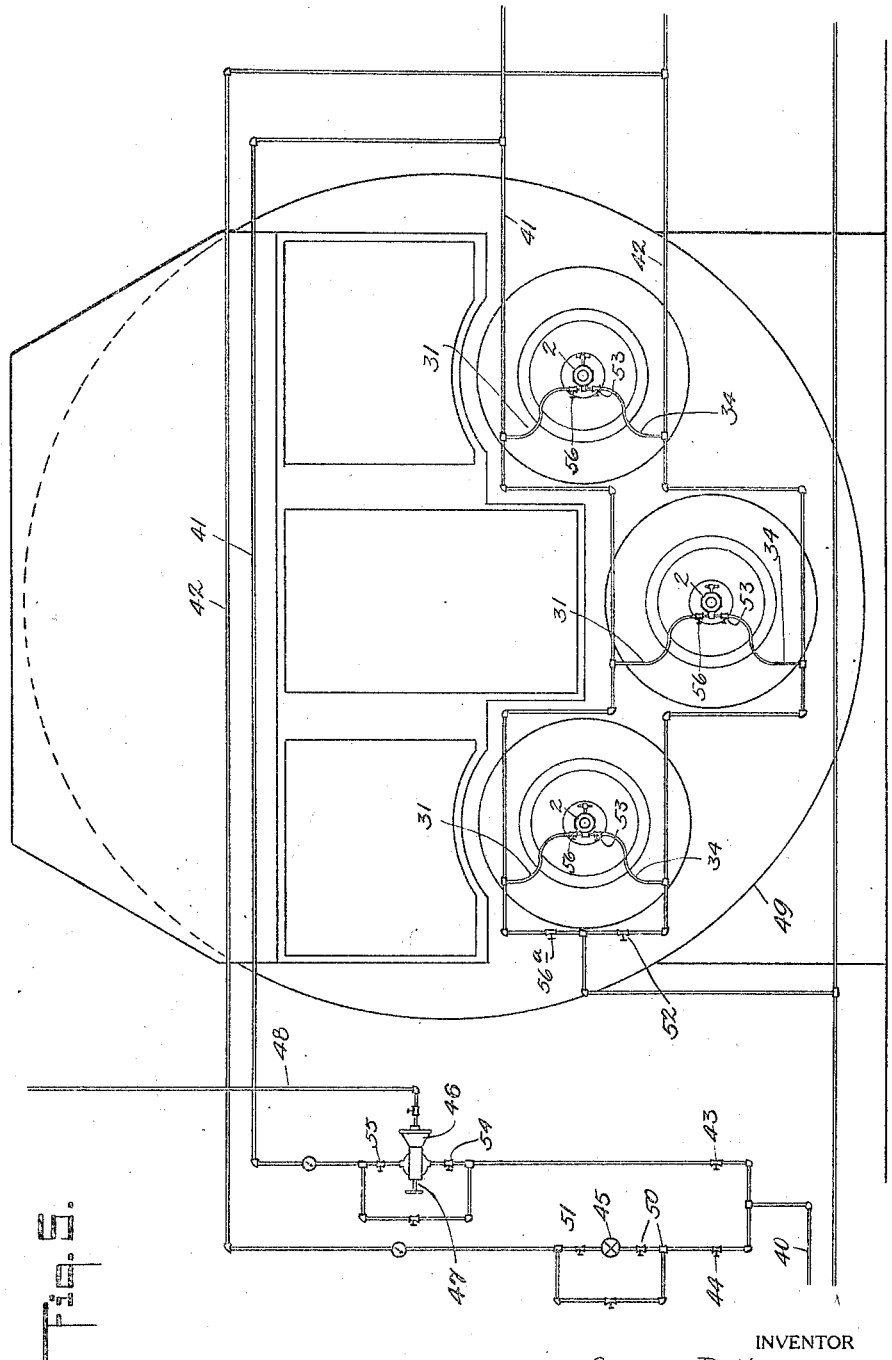

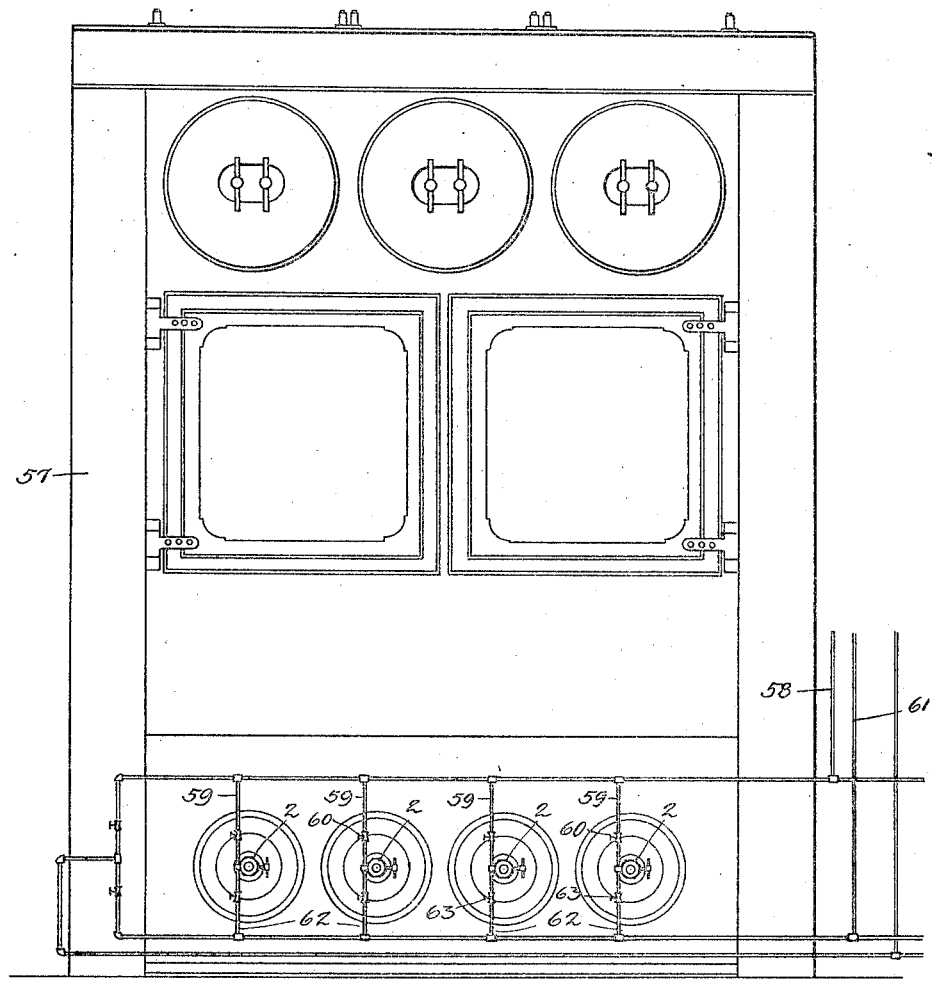

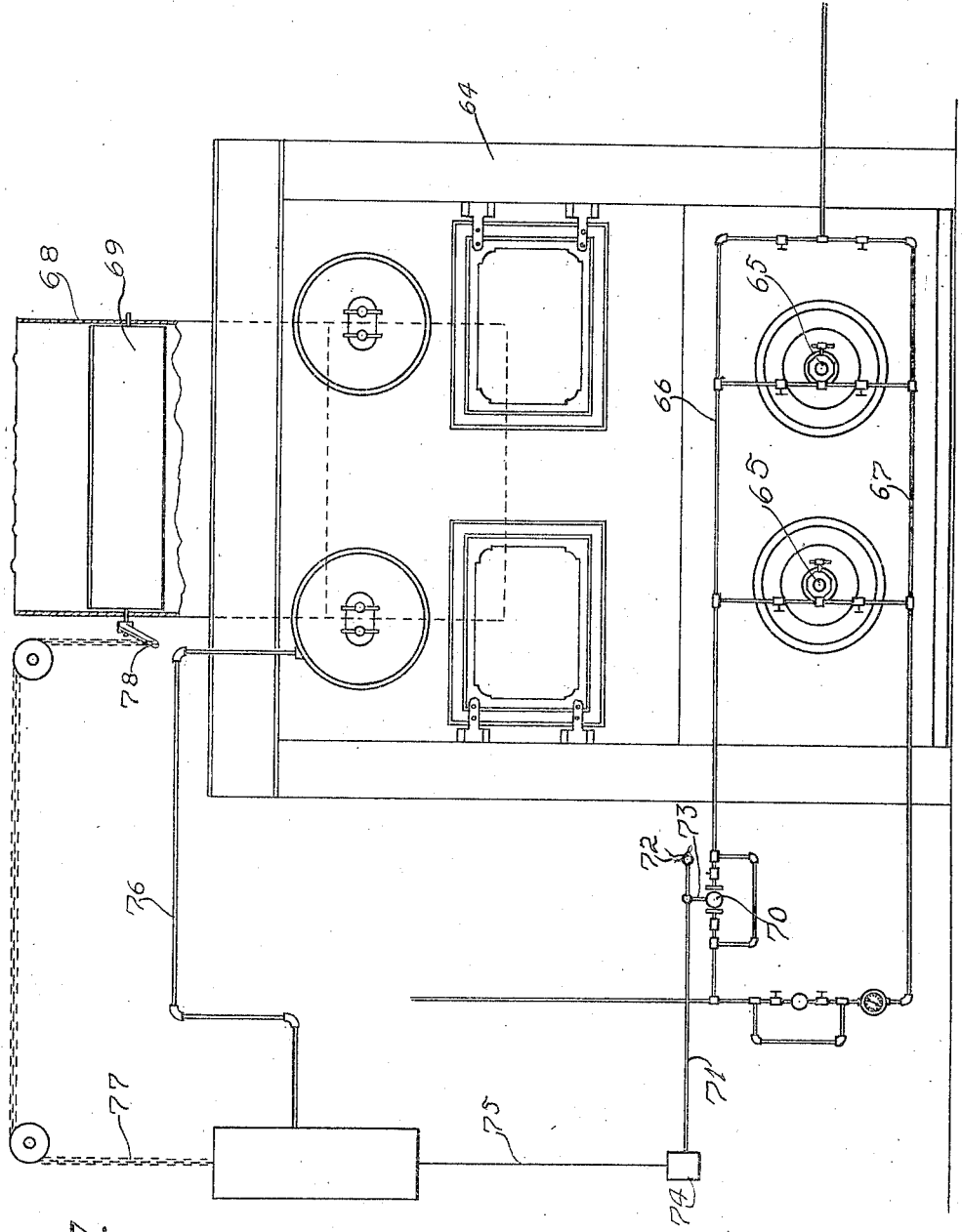

1,629,463

UNITED STATES PATENT OFFICE.

GEORGE P. HAYNES, OF NEW YORK, N. Y., ASSIGNOR TO TODD DRY DOCK, ENGINEERING & REPAIR CORPORATION, OF NEW YORK, N. Y., A CORPORATION OF NEW YORK.

SYSTEM OF LIQUID-FUEL-SUPPLY CONTROL.

Application filed August 22, 1924. Serial No. 733,641.

In apparatus for delivering liquid fuel, whether for flame production in furnaces and heaters, or for use in internal combustion engines, it is very desirable that provision be made whereby the quantity of liquid fuel delivered may be regulated within wide ranges to suit consumption needs, while maintaining efficient atomization.

Under existing methods of control the quantity of liquid fuel atomized can be varied only within a relatively limited range by reducing the pressure at which the fuel is supplied to the atomizer, because at too low a pressure atomization will be imperfect.

It is present day practice to equip atomizers with nozzles having delivery orifices of sizes best proportioned to the service for which they are intended, but no satisfactory provision is made for increasing the supply control range, without change of parts, to suit the great flexibility in load requirements found in certain classes of service.

Therefore, my present invention was conceived for the purpose of providing a liquid fuel supply control system whose flexibility comprehends the requirements of all practical load variations, without necessitating any change in the equipment employed.

My invention, in brief, includes a delivery apparatus and a double line of piping to convey liquid fuel from the pressure supply source to said delivery apparatus, each line having separate valved control means. One of these lines I call the main supply line and the other the auxiliary supply line. The delivery apparatus, which includes the atomizer, is provided with two ducts, one connecting with the main line and the other with the auxiliary line, these ducts, respectively, supplying separate passages which communicate with a common atomizer chamber. The auxiliary line is intended to convey liquid fuel in smaller quantity and at a lower pressure than the main line, so that by reason of the separate and independent control of said main and auxiliary lines, I am enabled to maintain efficient atomization of liquid fuel under an unusually wide range in the quantity delivered.

Since it is desirable that the proportionate supply of air as well as the supply of liquid fuel delivered to the furnaces, for efficient combustion, should be subject to automatic control, therefore my invention includes means whereby the quantity of air admitted to the furnace may be regulated by suitable control means operable by the variation in the steam demand on the boiler.

Other features and advantages of my invention will hereinafter appear.

In the drawings:

Figure 1 is a longitudinal sectional view of a delivery apparatus included in my invention.

Fig. 2 is a rear end view thereof looking in the direction of arrow 2 applied to Fig. 1.

Fig. 3 is a section through the atomizer, taken on the line 3—3 of Fig. 1.

Fig. 4 is a partial sectional view of the delivery apparatus with a modified rear portion thereof, showing control means for the auxiliary supply of liquid fuel.

Fig. 5 is a diagrammatic view including the front of a Scotch boiler and showing my improved system wherein a double line of piping is employed for the separately controlled supplies of liquid fuel to the atomizers.

Fig. 6 is a similar view of a furnace fitted with a plurality of burners in the same chamber, and Fig. 7 shows a modification.

In the example of my invention herein illustrated I have shown it as applied to boilers for steaming purposes, the delivery apparatus being represented in the form of an atomizing burner, and the systems of pipings, with their control means, as supplying furnaces equipped with a number of said burners.

The burner includes the usual air supply tube 1, which engages at its rear end with the housing 2 and has the deflector 3 provided at its forward end. An inner tube 4, in spaced relation within tube 1, engages at its rear end with the coupling member 5, and at its forward end has the atomizer $5^a$ screwed thereon. The structure thus far described is substantially according to usual practice in the Todd type of burner, the tube 4 serving as a duct to convey liquid fuel to the atomizer. Since, however, my invention comprehends the provision of two separate supplies of liquid fuel to the atomizer, I place another or central tube 6 in spaced relation within tube 4, said tube 6 having separate means of engagement with coupling member 5. The tube 4 is of larger capacity than tube 6 and is termed by me the main supply tube, and the central tube 6 I call the auxiliary supply tube.

As will be noted upon reference to Figs. 5 and 6, the liquid fuel supplies for the main and auxiliary tubes are individual and under separate control, the purpose whereof, so far as the burner structure is concerned, will presently appear.

The atomizer includes a circular block or disk 7 which is adapted to lie against the inner end of tube 4. As shown, the inner peripheral edge of tube 4 is bevelled and the opposed peripheral edge of disk 7 is coincidently bevelled in order that the disk may become seated and centered at said tube end.

Disk 7 is provided at its rear surface with a concentric tubular neck or extension 8, which fits snugly over a reduced end portion 9 of central tube 6, while a nut 10, which is screwed upon the inner end of tube 4, has a reduced opening 11 to engage the burner tip 12, that is placed against disk 7, so that the nozzle elements are united, and the tube 4 aligned, upon tightening up nut 10.

Said tip 12 has a flat base which lies against the forward surface of disk 7. Also said tip has a reduced cylindrical forward portion 13 to lie within the reduced opening 11 in the nut, and an annular, inclined shoulder 14, for engagement by an annular, inclined wall 15 formed between the opening 11 in the nut and the inner peripheral surface of said nut.

The disk 7, at its rearward surface 16, forms the end of the passage through tube 6, and at its forward surface is provided with a recess 17. Concentrically disposed about the disk 7 are a plurality of holes that extend therethrough. Some of these holes are parallel with the axis of the burner. These holes, of which three are here shown at 18, are aligned with the duct represented by the passage in tube 4, serving to convey liquid fuel from the main supply to the tip, tangential slits 19 in disk 7 (see Fig. 3) being employed as the means for transference from holes 18 to recess 17. Tip 12 has the central orifice 20 and rearward conical cavity 21, opposed to recess 17, said cavity and recess constituting a pocket which is entered by the streams of fuel prior to emission through orifice 20.

It has been shown that the main supply of liquid fuel is delivered through the atomizer by way of the plurality of holes 18. There is, however, another hole 22 through the disk 7. This hole extends angularly through the disk, communicating from the central tube 6, with a tangential slit 23 that leads to recess 17. By these means a smaller, or auxiliary supply of liquid fuel may be delivered through the atomizer.

The coupling member 5, which is secured in operative position against bushing 24 by housing screw 25 is here shown as provided with the separate chambers 26, 27; tube 4 opening into chamber 26, and tube 6 fitting into a central aperture 28 through coupling 5, which aperture opens into chamber 27. A passage 29 extends outwardly from chamber 26 through the coupling member into communication with a passage 30 in the bushing, and connection is made with said passage by a supply pipe 31. Similarly, a passage 32 extends outwardly from chamber 27 through the coupling member into communication with a passage 33 in the bushing and connection is made therewith by a supply pipe 34.

Now it will be apparent that when only a relatively small flame is required to issue from the burner the main supply of liquid fuel, which passes through tube 4, may be shut off entirely, leaving only the supply open to tube 6, which auxiliary supply, being delivered only to the single atomizer hole 22, will be sufficient in quantity to permit efficient atomization and hence thorough combustion to ensue at varying pressures. The relation between the capacity of hole 22, with its slit 23, and the plurality of holes 18, with their slits 19, may be such as is best suited to the service required of the burner.

In the modified form of burner shown in Fig. 4 the auxiliary supply of liquid fuel through central tube 6 can be regulated by means of a needle valve 35, here shown as controlling the passage 28 between chamber 27 and the rear end of tube 6. The stem 36 of said needle valve works through a stuffing box 37 formed in a plug 38 which is fitted in the rear end of the coupling to close chamber 27, said stem being provided with operating handle 39.

The system of distribution of liquid fuel supply from its pressure source to the burners, as shown in Fig. 5, comprises the pump line 40, with its continuing main supply line 41, and auxiliary supply line 42.

Master valves 43 and 44 respectively, in the main and auxiliary lines, serve to control them.

The auxiliary line 42 is provided with a reducing valve 45 whose function it is to normally cut down the pressure of liquid fuel below that of the main line.

As will be understood the main line 41 supplies liquid fuel to the tube 4 of the burner and the auxiliary line 42 supplies liquid fuel to the tube 6 of the burner.

Hence, assuming by way of example that liquid fuel is delivered by the pump at 200 pounds pressure and that pressure in the auxiliary line is cut down by the reducing valve to 60 pounds, it will be seen that a wide range of pressure is comprehended in the system. For, by means of the control valves, the pressure at which liquid fuel is atomized in this system may be anywhere between the maximum and minimum limits. The main line 41 connects with the burners by the branch pipes 31, and the auxiliary line 42 connects with said burners by the branch pipes 34. Portions of these branch pipes are also shown in Figs. 1, 2 and 4.

Pressure in the main supply line 41 may be reduced by the use of a master valve, as indicated at 43, between the pump and the first burner in line 41, and in this way every burner in the system which receives liquid fuel from the main line will receive a smaller quantity thereof than when said line is full open. Or the supply through said main line may be entirely cut off, by said master valve.

A valve 46 having adjusting wheel 47, may also be included in the main line, to be operated automatically by the boiler pressure, for which purpose it is subject to the influence of pressure through steam pipe 48.

In ordinary practice it is desirable to keep the auxiliary supply line 42 full open, though at the lower pressure set by the reducing valve, so that there can be no danger of the entire liquid fuel supply being cut off, and pressure can be increased at will by opening up the main line 41 to any desired degree.

The range of reduction in the auxiliary supply can be further augmented (1) by means of pressure reducing valve 45, (2) by making the atomizer slit 23 smaller in proportion to the atomizer slits which are supplied by the main line, and (3) by the use of the needle valve 35 shown in Fig. 4.

In starting up the furnaces for boiler 49, Fig. 5, all the valves in the supply lines 41, 42, being closed, first reducing valve 45 is set to the desired pressure and valves 44, 50, 51 and 52 are opened, permitting liquid fuel to circulate through the auxiliary line 42, returning to the source of supply. This serves to warm up the piping. Then valve 52 is closed and the valves 53 in branches 31 are opened, permitting liquid fuel to flow through the burner tubes 6 to the auxiliary atomizer slit. Thereafter, to satisfy a heavier load, the valves 43, 54, 55, and master control valve 46 are opened in main line 41, whereupon liquid fuel will flow through the main line to branches 34, and, upon the opening of valves 56 in said branches the main supply tubes 4 of the burners will convey the regulated supply to the atomizer slits 19. Valve 56ª should remain closed except when return to the source is desired.

In the instance of a boiler or single furnace which is fitted with a plurality of my improved burners, the valving can be so arranged that the supply of liquid fuel through the main line can be shut off completely, and also the supply through the aux- iliary line can be shut off from all but one of the burners. That one burner remaining lighted from the auxiliary line will serve as a pilot and will re-light the other burners when the main supply is opened up again.

An example of this phase of my improved system is shown in Fig. 6 wherein a single furnace 57 is shown as provided with four burners, each supplied from a main line 58, through branches 59, having valves 60; and from an auxiliary line 61 through branches 62, having valves 63. Supposing all the valves 60 to be closed, and all but one of the valves 63 also closed, then the burner controlled by that open valve would provide the pilot flame referred to.

In Fig. 7, I have shown a boiler 64 whose furnace contains a plurality of burners 65, each provided with the dual supply means for liquid fuel, under separate control, as previously described, the main pipe line being indicated at 66, and the auxiliary line at 67.

This furnace is shown as provided with a stack 68 having a damper 69 by which the supply of air to the furnace may be regulated.

Automatic control for both liquid fuel and air is exemplified through the medium of any standard damper control device which is subject to the influence of steam pressure from the boiler, and is capable of communicating motion both to the damper 69 and to a valve 70 that controls the passage of liquid fuel through the main supply line 66. In this example the valve 70 is held closed by a weighted lever 71, pivoted at 72 and engaging the valve stem 73 to hold the valve to its seat by the gravity action of weight 74. Said weight is connected by a flexible connector 75 with a moving element of the control device, and lifts according to the degree of boiler pressure applied to said device through steam pipe 76. The damper 69, which normally may be held in a closed position as by gravity or other means, is connected with the moving element of the control device by a flexible connector 77 that also engages its operating lever 78.

Variations within the spirit and scope of my invention are equally comprehended by the foregoing disclosure.

I claim:

1. The combination with a boiler having a plurality of liquid fuel burners and a source of liquid fuel supply under pressure, of a main supply line of piping extended from said source, an auxiliary supply line of piping also extended from said source, branch pipes leading from said main and auxiliary lines respectively to each of the burners, said burners being provided each with means for atomizing the supplies of liquid fuel received either separately or jointly from the respective main and auxiliary lines, individual master control means respectively in the main and auxiliary lines of piping to equally control the flow of liquid fuel to all the burners supplied by the respective lines of piping, air supply control means, and means operable to actuate the master control means in the main line of piping and the air supply control means for the proportionate regulation of the respective liquid fuel and air supplies.

2. The combination with a boiler having a plurality of liquid fuel burners and a source of liquid fuel supply under pressure, of separate lines of piping extended from said source, and branch pipes leading from each line of piping to the burners respectively, each burner being provided with means for atomizing the liquid fuel supplied thereto either separately or jointly through the respective lines of piping, individual master control means in each line of piping to equally control the flow of liquid fuel to all the burners supplied by the respective lines of piping, air supply control means, and means operable to actuate one of said master control means and the air supply control means, for proportionate regulation of the respective liquid fuel and air supplies.

3. The combination with a boiler having a plurality of liquid fuel burners and a source of liquid fuel supply under pressure, of a main supply line of piping extended from said source, an auxiliary supply line of piping also extended from said source, branch pipes leading from said main and auxiliary lines respectively to each of the burners, said burners being provided each with means for atomizing the supplies of liquid fuel received either separately or jointly from the respective main and auxiliary lines, individual master control means respectively in the main and auxiliary lines of piping to equally control the flow of liquid fuel to all the burners supplied by the respective lines of piping, air supply control means, and means operable by the variation in the steam demand on the boiler to actuate the master control means in the main line of piping for the proportionate regulation of the respective liquid fuel and air supplies.

4. The combination with a boiler having a plurality of liquid fuel burners and a source of liquid fuel supply under pressure, of separate lines of piping extended from said source, and branch pipes leading from each line of piping to the burners respectively, each burner being provided with means for atomizing the liquid fuel supplied thereto either separately or jointly through the respective lines of piping, individual master control means in each line of piping to equally control the flow of liquid fuel to all the burners supplied by the respective lines of piping, air supply control means, and means operable by the variation in the steam demand on the boiler to actuate one of said master control means for the proportionate regulation of the respective liquid fuel and air supplies.

Executed this 19th day of August, 1924.

GEORGE P. HAYNES.